March 24, 1942.  E. DE LILLO  2,277,081
TONGS
Filed Oct. 23, 1939
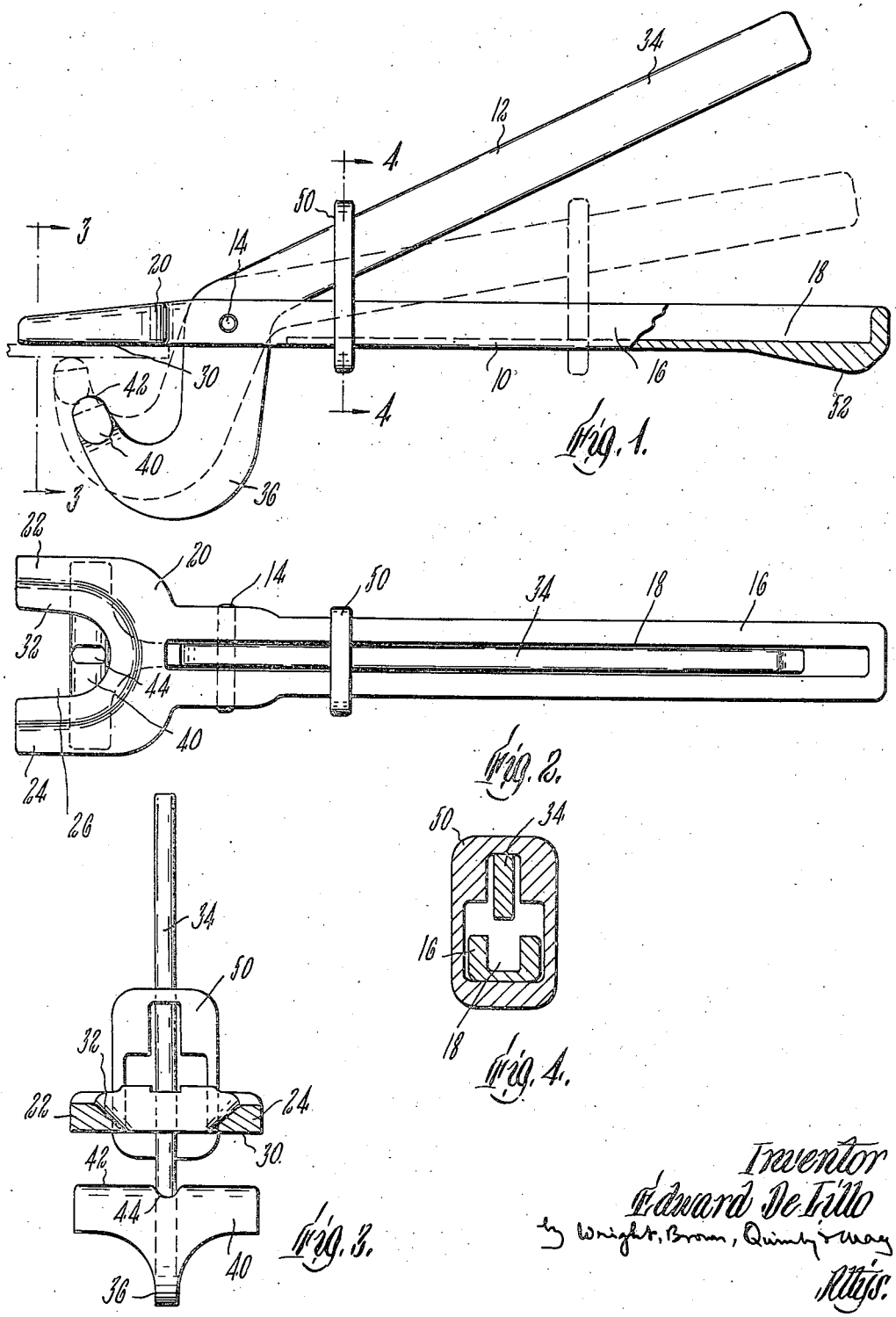

Patented Mar. 24, 1942

2,277,081

UNITED STATES PATENT OFFICE 2,277,081

TONGS

Edward De Lillo, Brockton, Mass.

Application October 23, 1939, Serial No. 300,759

1 Claim. (Cl. 113—99)

This invention relates to improved tongs or pinchers for gripping sheet metal and the like.

When sheet-metal objects such as automobile fenders are torn they are customarily repaired by restoring the fender as nearly as possible to its original shape, and then welding the edges of the tear together. The weld is ground smooth and the surface is coated with suitable protective finishing material. To get a smooth weld, the marginal portions of the fender on either side of the tear must be held in line until a spot-weld is made at or near the open end of the tear. This spot-weld then holds the edges of the tear in proper relation while the welding operation is being carried on to completion.

It is an object of the present invention to provide a convenient and effective tool for gripping the marginal portions of a fender or other equivalent article on both sides of a tear so as to hold such portions properly in line until joined by a spot-weld. It is a further object of the invention to provide such a tool so formed as to be useful in other ways in repairing injured fenders and the like.

For a more complete understanding of the invention, reference may be had to the following description thereof, and to the drawing of which Figure 1 is a side elevation of a pair of tongs embodying the invention.

Figure 2 is a plan view of the same.

Figure 3 is a section on the line 3—3 of Figure 1.

Figure 4 is a section on the line 4—4 of Figure 1.

As shown, the tongs comprise a pair of members 10 and 12 which are pivotally connected by a hinge pin 14. The member 10 comprises a handle portion 16 which, as indicated in Figure 4, may be formed with a channel 18 extending lengthwise thereof. The member 10 also includes a jaw portion 20 which is U-shaped as indicated in Figure 2, this jaw portion having a pair of horns 22 and 24 projecting away from the axis of the pivot pin 14, these horns having a deep recess 26 between them. As indicated in Figure 1, the member 10 is substantially straight when viewed from the side, the jaw portion 20 having an inner face 30 which is in a plane parallel to the axis of the pin 14. The horns 22 and 24 are of substantial thickness, tapering slightly toward their ends, the marginal portions of the jaw surrounding the recess 26 being beveled as at 32.

The member 12 includes a straight handle portion 34 which is adapted to enter the channel 18 so as to telescope laterally with the handle portion 16 of the member 10. The member 12 also includes an arcuate jaw portion 36 which is U-shaped when viewed from the side and which extends from the pivot pin 14 in a direction almost at right angles to the handle portion 34, curving to its extremity which consists of a transverse bar 40 having a rounded contacting surface 42 which is movable into engagement with the inner face 30 of both of the horns 22 and 24. The transverse bar 40 is preferably provided with a central notch 44 in the portion of the bar which is presented to the other jaw. When the marginal portion of a torn sheet-metal object such as an automobile fender is pinched between the jaws to hold the portions on either side of the tear in line for spot-welding, the notch 44 facilitates spot-welding by providing a clearance between a sheet-metal object and the central portion of the bar 40 to prevent any possibility of the sheet metal being welded to the bar 40.

During the spot-welding operation, the jaws may be held in clamped position by means of a locking ring or keeper 50. As shown in Figure 4, this keeper may be formed with a central aperture adapted to fit loosely on the two handle portions 16 and 34. When the handles are swung together to clamp the jaws against an object between them, the keeper 50 is pushed along the handles toward their ends as far as it wil go. This maintains the tongs in clamped position until released by sliding the keeper back toward the pivot. A suitable lug 52 is preferably formed on one of the handles to prevent the keeper from accidentally sliding off the handles when the tongs are not in use.

It is evident that various modifications and changes may be made in the embodiments of the invention herein shown and described without departing from the spirit or scope thereof as defined in the following claim.

I claim:

Tongs of the type described having one arcuate jaw terminating in a transverse bar having a rounded gripping surface with a central notch, and a second jaw having a pair of horns engageable by said bar so that said notch is between said horns, the inner face of said second jaw opposed to said arcuate jaw being in a single plane.

EDWARD DE LILLO.